United States Patent [19]

Hoppe et al.

[11] Patent Number: 5,241,056
[45] Date of Patent: Aug. 31, 1993

[54] REACTIVE MONOAZO DYESTUFFS WHICH CONTAIN ALKYLBENZENE AND CHLOROFLUORO PYRIMIDINE SUBSTITUENTS

[75] Inventors: Manfred Hoppe, Kürten; Karl-Josef Herd, Odenthal-Holz; Hermann Henk, Cologne, all of Fed. Rep. of Germany

[73] Assignee: Bayer Aktiengesellschaft, Leverkusen, Fed. Rep. of Germany

[21] Appl. No.: 878,130

[22] Filed: May 4, 1992

[30] Foreign Application Priority Data

May 14, 1991 [DE] Fed. Rep. of Germany ....... 4115622

[51] Int. Cl.$^5$ .................... C09B 62/245; D06P 1/382
[52] U.S. Cl. .................... 534/632; 534/638; 8/549
[58] Field of Search ................ 534/632, 638

[56] References Cited

U.S. PATENT DOCUMENTS 4,007,164 2/1977 Bien et al. .............. 534/638 X
5,093,482 3/1992 Schundehutte et al. ....... 534/638 X

FOREIGN PATENT DOCUMENTS 0016931 10/1980 European Pat. Off. .
0377189 7/1990 European Pat. Off. .
2920949 11/1980 Fed. Rep. of Germany ...... 534/632
1165661 10/1969 United Kingdom .

OTHER PUBLICATIONS

Japanese Chemical Abstract, J5-F, Textiles, Paper, Cellulose=p. 4, Week C41, FARB, F06, 62598 C/36=J5 5112-270 (1979).

*Primary Examiner*—Mary C. Lee
*Assistant Examiner*—Fiona T. Powers
*Attorney, Agent, or Firm*—Sprung Horn Kramer & Woods

[57] ABSTRACT

Reactive dyestuffs of the formula

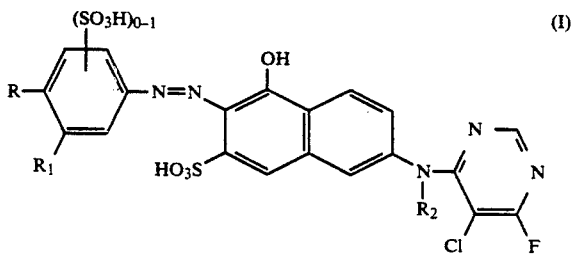

and the meanings of substituents given in the description produce on hydroxyl- and amido-containing fibre materials orange dyeings which are fast to boiling.

6 Claims, No Drawings

REACTIVE MONOAZO DYESTUFFS WHICH CONTAIN ALKYLBENZENE AND CHLOROFLUORO PYRIMIDINE SUBSTITUENTS

The present invention relates to reactive dyestuffs of the formula

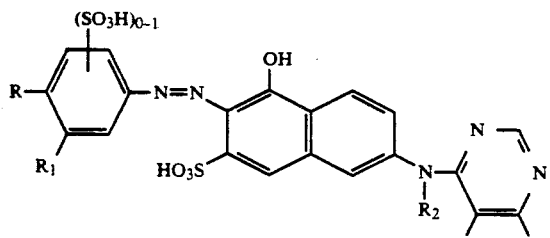

and salts thereof, in particular alkali metal salts or ammonium salts thereof. Of these, lithium salts are preferred, in particular in the case of dyestuffs having 2 sulpho groups.

R is substituted or unsubstituted $C_1$-$C_5$-alkyl, cyclohexyl or aryl, in particular substituted or unsubstituted phenyl, $R_1$ is H or a substituent, in particular sulpho, halogen, in particular Cl or Br, $C_1$-$C_4$-alkyl, $R_2$ is H, $CH_3$, $C_2H_5$.

The formula (I) shows the sulpho-containing dyestuffs in the form of their free acids.

The preparation of the dyestuffs I is carried out, for example, by the following processes:

1. By condensation of a reactive component of the general formula

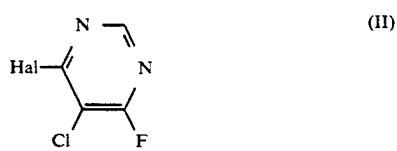

in which

Hal represents chlorine or fluorine, with an aminoazo dyestuff of the general formula

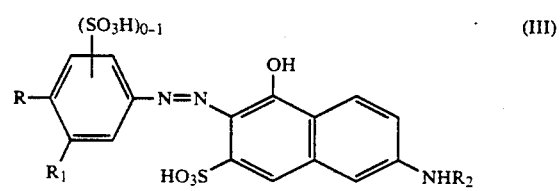

in which

R, $R_1$ and $R_2$ have the meaning given;

2. by azo coupling of a condensation product of the formula

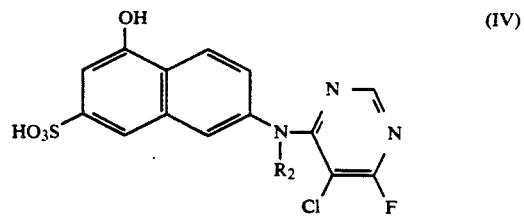

with diazonium compounds obtained in the usual manner from the amines of the general formula (V)

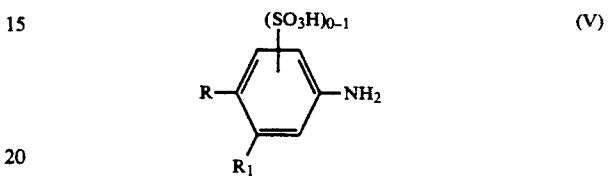

in which

R, $R_1$ and $R_2$ have the meaning given.

Reactive components of the general formula (II), for example 4,6-difluoro-5-chloropyrimidine or 4,5-dichloro-6-fluoropyrimidine, are known and obtainable, for example, from 4,5,6-trichloropyrimidine by fluoride exchange with HF or alkali metal fluorides in aprotic solvents.

The condensation with the aminoazo dyestuffs of the formula (III) is preferably carried out in aqueous solution or suspension in a pH range from 4–7. The hydrogen halide liberated is buffered by addition of aqueous alkali, in particular lithium hydroxides, lithium carbonates or lithium bicarbonates.

The aminoazo dyestuffs of the general formula (III) can be obtained in the usual manner by azo coupling of diazonium compounds from the amines of the general formula (V) with compounds of the formula (VI), the conditions selected being such that the coupling takes place in the o-position relative to the OH group of the I acid derivative.

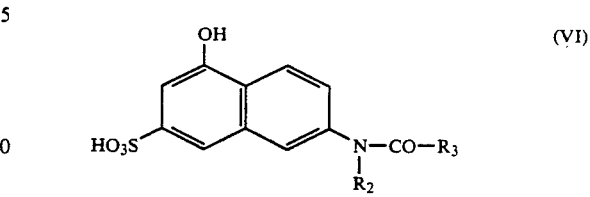

$R_3$ represents a substituted or unsubstituted aliphatic or aromatic radical.

The acyl radical —$CO_2R$ is cleaved off after the coupling reaction by heating in acidic or alkaline medium.

Suitable acyl radicals are in particular formyl, acetyl, maloyl carbamoyl or phthaloyl.

The following compounds are preferred as diazo components of the general formula (V): 1-amino-4-methylbenzene-2-sulphonic acid, 1-amino-4-methylbenzene-3-sulphonic acid, 1-amino-4-ethylbenzene-2-sulphonic acid, 1-amino-4-ethylbenzene-3-sulphonic acid, 4-aminodiphenyl-2-sulphonic acid, 1-amino-4-methylbenzene-2,5-disulphonicacid,1-amino-4-ethylbenzene-2,5-disulphonic acid.

The new dyestuffs are suitable for the dyeing and printing of, in particular, hydroxyl- and amido-containing materials, such as textile fibres, yarns and fabrics made of wool and silk, and in particular for the dyeing and printing of native or regenerated cellulose, the treatment of cellulose materials advantageously being carried out in the presence of acid-binding agents and, if desired, by exposure to heat using the processes known for reactive dyestuffs.

EXAMPLE 1

23.9 g of 2-amino-5-hydroxynaphthalene-7-sulphonic acid are dissolved in 175 ml of water at 35° C. together with about 20 ml of 20% strength sodium hydroxide solution. The pH is then brought to about 5.5 by addition of about 7 ml of 36% strength hydrochloric acid. 15.1 g of 4,6-difluoro-5-chloropyrimidine are slowly added dropwise to the suspension thus obtained at 35° C. After temporary dissolution, the light grey acylation product of the formula

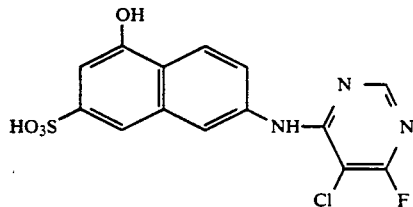

slowly precipitates. During condensation, the pH is maintained at 5.1 to 5.3 using dilute sodium carbonate solution or by addition of dilute LiOH or sodium hydroxide solution.

A suspension of the diazonium compound obtained in the usual manner from 19.1 g of 1-amino-4-methylbenzene-2-sulphonic acid in about 200 ml of dilute hydrochloric acid are stirred into the suspension thus obtained with ice cooling. The pH is maintained at about 6.5 by addition of sodium carbonate or, preferably, lithium carbonate. Stirring is continued for several hours, after which the precipitated dyestuff is filtered off with suction and dried at about 50° C. in vacuo. The dyestuff is then present as a red-brown powder and dyes cotton in orange hues. It has the following structure:

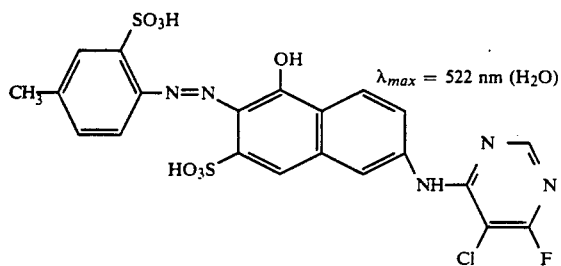

EXAMPLE 2

51.7 g of the aminoazo dyestuff of the formula

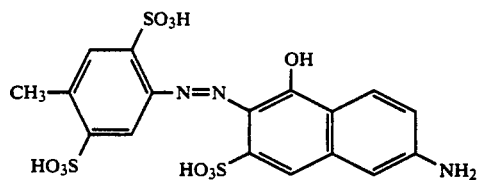

are dissolved in 350 ml of water at 70° C. together with about 20 ml of 20% strength sodium hydroxide solution. 16.6 g (0.11 mol) of 4,6-difluoro-5-chloropyrimidine is added to the solution thus obtained at 70°, while maintaining the pH between 5.3 and 5.5 with sodium carbonate solution and maintaining the temperature at 70° C. After about 3–4 hours, the condensation is complete. 250 ml of water are then added and the dyestuff is precipitated at 50° C. using 140 g of common salt. The precipitated dyestuff is then filtered off with suction and dried at about 50° C. in vacuo. The product is then present as an orange powder, which gives an orange solution in water and dyes cotton in orange hues.

It has the following structure:

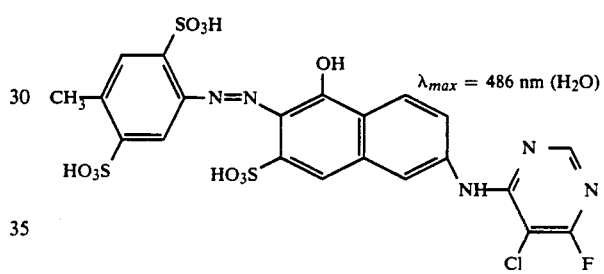

We claim:
1. A reactive dyestuff of the formula

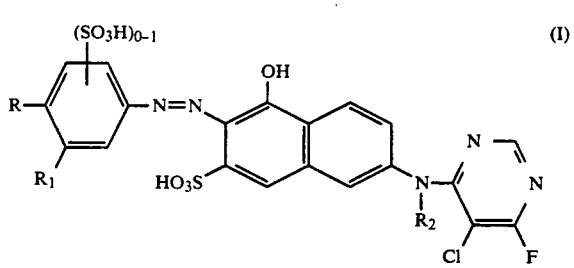

or salt thereof, in which
  R is substituted or unsubstituted $C_1$-$C_5$-alkyl, cyclohexyl or aryl,
  $R_1$ is H, sulpho, halogen, or $C_{1-4}$ alkyl, and
  $R_2$ is H, $CH_3$, or $C_2H_5$.
2. A dyestuff according to claim 1, in which R is $C_2H_5$ or $CH_3$.
3. A dye stuff according to claim 1, in which $R_1$ is H, sulpho, or halogen, and $R_2$ is H.
4. A dyestuff according to claim 1, in which
  R is $CH_3$,
  $R_1$ is $SO_3H$ or H,
  $R_2$ is H.
5. A dyestuff according to claim 1, which is of the formula

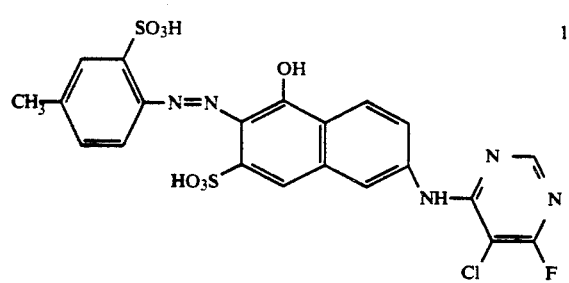
or
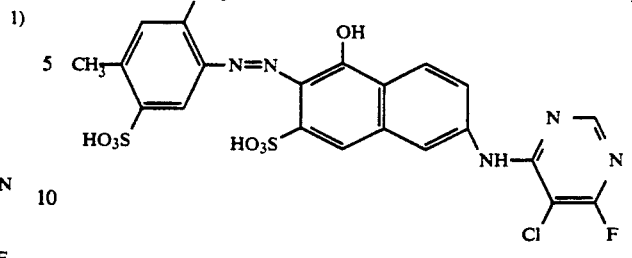
6. A process for the dyeing or printing of hydroxy- or amido-containing materials by applying thereto a dyestuff according to claim 1.
* * * * *